June 17, 1930. F. W. C. A. FELD 1,764,873
APPARATUS FOR THE GENERATION OF STEAM AND HOT WATER
Filed Feb. 8, 1926
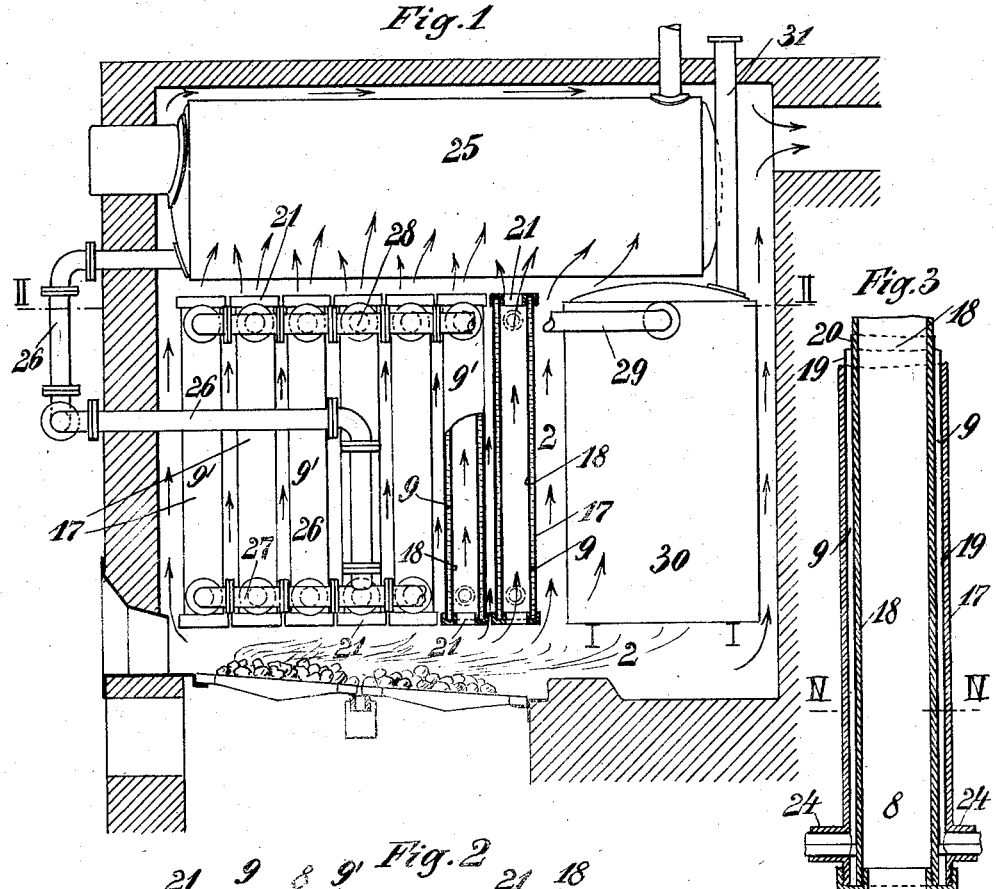
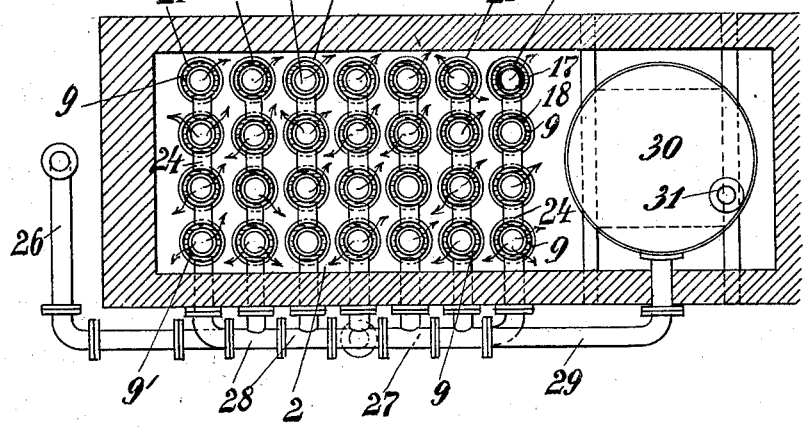

Patented June 17, 1930

1,764,873

UNITED STATES PATENT OFFICE

FRIEDRICH WILHELM CARL ALEX FELD, OF BARMEN-RITTERSHAUSEN, GERMANY

APPARATUS FOR THE GENERATION OF STEAM AND HOT WATER

Application filed February 8, 1926, Serial No. 86,891, and in Germany February 14, 1925.

The invention relates to apparatus for the generation of steam and hot water and as for its object contemplates the provision of an improved construction in this type of apparatus.

The invention consists briefly of a plurality of interconnected water tubes arranged in parallel relation and vertically above a source of heat, each of the tubes having an inner wall and concentric outer wall forming a narrow annular water space therebetween while the upper and lower ends of the walls are connected together by joints in the form of caps each of which in turn have inner and outer peripheral flanges forming a channel, the sides of which are threaded to the ends of the tubular wall, the cap being constructed to present a relatively large area to the radiant energy from the source of heat.

Other objects as well as the nature, characteristic features and scope of the invention will be more readily apparent taken in connection with the accompanying drawing and pointed out in the claims forming a part of this specification.

An embodiment of the invention is illustrated, by way of example, in the accompanying drawings in which:—

Fig. 1 is a side elevation partly in section.

Fig. 2 is a horizontal section on line II—II of Fig. 1.

Fig. 3 shows on larger scale one of the two-walled heating tubes.

Fig. 4 is a section on line IV—IV of Fig. 3.

The apparatus according to the invention consists, as shown in the drawing, of a plurality of tubular double-walled heating bodies 8, arranged in the heating space 2 vertically above the source of heat—in the form of construction shown above the grate or in gas bath ovens above the burners (not shown) open at the bottom and at the top ends, and designed to conduct the water. These heating bodies 8 consist each of a wide outer envelope 17 and of a narrower inner envelope 18. The two envelopes are connected with one another at the upper and lower ends by open, exchangeable closing joints 21. The water, to be heated or to be transformed into steam, is preferably in a thin layer conducted through the interval between the wider and narrower envelopes. The hot gases ascending from the source of heat can thus come in contact with the water-conducting heating bodies 8 from the inside and from the outside, that is, from all sides.

The outer and the inner diameters of the seamless metal envelopes may be of any length, but preferably short, in order to obtain the greatest possible useful heating surface in the furnace at disposal.

These individual double-walled seamless heating bodies 8 are all of the same height and united in groups or heating batteries 9', each comprising any desired number of heating bodies, in the form of construction illustrated four heating bodies, connected at the bottom and top by means of water conducting connecting tubes 24. The water conducting heating elements, which are thus connected with one another, together with their outer envelopes and connecting tubes 24, the latter being of any desired cross section, may be cast from steel or other metals in one piece. The heating batteries comprising each several heating elements 8 are connected with one another at the bottom end by means of tubular T-connection 27 connected themselves with the water supply pipe 26 and at the top by corresponding steam outflow tubes 28 to form one total tube complex of any desired number of double-walled heating tubes. By the hot gases ascending from the source of heat, which come in contact with the tubes from all sides, from the inside and the outside, the water enclosed between the seamless tubular envelopes is thus heated and transformed into steam in the most rapid manner.

By the combination of the individual heating bodies in batteries or groups and by the connection of the same to a total tube complex the efficiency of the plant is increased.

By the separate closing of the individual double-walled heating bodies large heating surfaces are obtained in a limited space.

By the vertical position of the heating body with regard to the grate-surface, or to the source of heat the advantage is further obtained, that the heating gases ascending from the source of heat are forced to come uniformly in contact with all points of the heating surfaces or of the inner and outer envelopes of the water conducting heating bodies, whereby an almost perfect utilization of the fuels is obtained and the efficiency of the plant is considerably increased. Owing to the vertical arrangement of the double-walled heating bodies a high water level in relation to the cross section of the water space is obtained.

As soot cannot well deposit on the vertical metal walls, the formation of soot is prevented, especially also by the fact that the hot gases, on the way through the combustion chamber, remain always in communication with the source of heat (for instance the grate), whereby an almost complete combustion of the fuels up to the main flue is obtained wherefrom results a great economy in fuel.

On the other hand the life of the heating bodies is considerably increased by the efficiency of the heat conducting and by the admission of hot gases in accordance with the content of water, as with a smaller grate surface great heating surfaces are produced so that the hot gases are distributed over the total heating surfaces.

The tubes or metal envelopes of the individual heating bodies 8 might further, as can be seen from Figs. 3 and 4, be lined with exchangeable inner jacket 19 and 20 of good heat conducting metal as aluminium, copper or the like. These insertion tubes serve to prevent the formation of scale or incrustation, which at the same time is scarcely to be feared, as at the rapid circulation the water flows gyrating through the tube envelopes.

The water to be heated or to be transformed into steam flows, in the form of construction shown, from a feed-water boiler 25 arranged in the upper portion of the closed heating space 2, preliminarily heated in this boiler 25, through the water supply pipes 26 and through the tubular water T-connections 27 connected with one another and with the tubular connections 24 of the double-walled seamless heating tubes 8 into the narrow water chambers 9 formed by the walls of the heating tubes, into which it is forced by means of a pump not shown in the drawing. The upper ends of the double-walled heating bodies 8 connected also here with one another by tubular nipples into groups or batteries, are connected with a steam outflow tube composed of several T-connections 28, and the extension 29 which terminates in a steam collector 30 built behind the groups 9' into the outlet for the hot air, from which the steam generated between the water conducting seamless tubular envelopes of the heating bodies 8 and accumulated in the boiler is further led off by the tube 31. The connection of the seamless double-walled heating bodies of equal height at the lowest points has the object, to effect a uniform rising of the water in all groups, said water being thus rapidly and uniformly heated and transformed into steam.

The present invention may be preferably used, besides in the form of construction shown, for all kinds of hot water and steam-generation, especially for the heating of liquid, as gas bath ovens, and also for steam generators, superheaters, heat accumulators and the like.

By the individual closing of double-walled, water conducting heating bodies and owing to the narrow cross section of the water space, the invention is especially adapted for steam generation, at high pressure, which must act as well upon the inner as upon the outer wall of metal of each heating body.

I claim :—

1. Apparatus for the generation of hot water and steam comprising a plurality of interconnected water tubes arranged in parallel relation, and vertically above a source of heat, each consisting of an inner and an outer tubular wall, forming between them a narrow annular water space, and caps connecting the lower ends of said walls, said caps being similar, and each having spaced inner and outer peripheral flanges, forming a channel, the sides of which are threaded to the ends of said tubular walls, said caps presenting a relatively large area to the radiant energy from said source of heat.

2. Apparatus for the generation of hot water and steam comprising a heating chamber, a source of heat, a plurality of rows of interconnected water tubes arranged in parallel relation with the tubes vertically above said source of heat, interchangeable means interconnecting said rows outside said heating chamber, said water tubes each consisting of an inner and an outer tubular wall forming between them a narrow annular water space, annular caps connecting the lower ends of said walls, said caps being similar and each having a spaced inner and outer peripheral flange forming a channel, the sides of which are threaded whereby said caps are screwed upon the ends of said tubular walls, said caps presenting a relatively large area to the radiant energy of said source of heat.

In testimony whereof I affix my signature.

FRIEDRICH WILHELM CARL ALEX FELD.